(12) United States Patent
Kobayashi

(10) Patent No.: US 7,721,727 B2
(45) Date of Patent: May 25, 2010

(54) COOKING STOVE

(75) Inventor: Toshihiro Kobayashi, Nagoya (JP)

(73) Assignee: Paloma Industries, Limited, Nagoya-Shi (JP)

( * ) Notice: Subject to any disclaimer, the term of this patent is extended or adjusted under 35 U.S.C. 154(b) by 0 days.

(21) Appl. No.: 11/744,297

(22) Filed: May 4, 2007

(65) Prior Publication Data
US 2007/0199558 A1 Aug. 30, 2007

Related U.S. Application Data

(63) Continuation of application No. PCT/JP2005/010421, filed on Jun. 7, 2005.

(30) Foreign Application Priority Data

Nov. 15, 2004 (JP) ............................. 2004-330650

(51) Int. Cl.
*F23H 1/02* (2006.01)
(52) U.S. Cl. .............................. 126/152 R; 126/163 R; 126/152 B
(58) Field of Classification Search ............. 126/152 R, 126/1 R, 211, 217, 214 R, 400, 332, 333, 126/163 R, 173, 51, 152 B; 219/455.11, 219/455.12
See application file for complete search history.

(56) References Cited

U.S. PATENT DOCUMENTS

| | | | | |
|---|---|---|---|---|
| 1,808,550 A | * | 6/1931 | Harpman | 126/215 |
| 1,948,699 A | * | 2/1934 | Dalen | 126/182 |
| D128,164 S | * | 7/1941 | Hennessey | D7/408 |
| 2,485,145 A | * | 10/1949 | Evans | 126/214 R |
| 2,530,991 A | * | 11/1950 | Reeves | 126/214 C |
| 2,861,563 A | * | 11/1958 | Jensen | 126/214 C |
| 2,930,194 A | * | 3/1960 | Perkins | 60/748 |
| 3,051,818 A | * | 8/1962 | Prather | 219/453.14 |
| 3,165,201 A | * | 1/1965 | Woodman | 206/448 |
| 4,257,760 A | * | 3/1981 | Schuurman et al. | 431/158 |
| 4,869,062 A | * | 9/1989 | Bar | 60/39.464 |
| 4,963,089 A | * | 10/1990 | Spielman | 431/351 |
| 5,079,408 A | * | 1/1992 | Jordan, Jr. | 219/443.1 |
| D340,383 S | * | 10/1993 | Addison et al. | D7/407 |
| D353,300 S | * | 12/1994 | Edman et al. | D7/408 |

(Continued)

FOREIGN PATENT DOCUMENTS

FR 1127095 * 12/1956

(Continued)

*Primary Examiner*—Kenneth B Rinehart
*Assistant Examiner*—Jorge Pereiro
(74) *Attorney, Agent, or Firm*—Burr & Brown

(57) ABSTRACT

According to a gas table 1, combustion gas (including the flame) is jetted from a flame port 17 of a burner 14 diagonally upward entirely twisted in the burner circumferential direction. The combustion gas flows into plural combustion gas routes sectioned into spiral shape, and hits trivet claws 22, and goes through. That is, the combustion gas is guided in spiral shape by the trivet claws 22, and exhausted along a cooking container P bottom surface toward the outer circumferential direction. As a result, in the combustion gas route, the combustion gas is always subject to direction changing force and the flow thereof is disturbed, and accordingly, a heat transmission border film is unlikely to be formed on the cooking container P bottom surface, and the heat of the combustion gas is transmitted to the bottom surface of the cooking container P preferably.

8 Claims, 17 Drawing Sheets

U.S. PATENT DOCUMENTS

| | | | | |
|---|---|---|---|---|
| D364,534 S | * | 11/1995 | Brown et al. | D7/407 |
| D364,993 S | * | 12/1995 | Andrea | D7/407 |
| 5,643,481 A | * | 7/1997 | Brotzki et al. | 219/455.12 |
| 5,899,681 A | * | 5/1999 | Maughan | 431/8 |
| 6,092,518 A | * | 7/2000 | Dane | 126/214 D |
| 6,299,436 B1 | * | 10/2001 | Huang | 431/354 |
| 6,429,408 B2 | * | 8/2002 | Muskalla et al. | 219/429 |
| 6,851,420 B2 | * | 2/2005 | Jennings | 126/39 R |

FOREIGN PATENT DOCUMENTS

| | | | |
|---|---|---|---|
| GB | 481578 | * | 6/1936 |
| GB | 481578 | | 3/1938 |
| JP | 61-225519 | A1 | 10/1986 |
| JP | 02-140210 | U1 | 11/1990 |
| JP | 07-127870 | A1 | 5/1995 |
| JP | 2002-310438 | A1 | 10/2002 |
| JP | 2003-161449 | A1 | 6/2003 |
| JP | 2003-166718 | A1 | 6/2003 |

* cited by examiner

COOKING STOVE

This is a Continuation Application of PCT Application No. PCT/JP2005/010421 with an international filing date of Jun. 7, 2005.

This application is based upon and claims the benefit of priority from prior Japanese Patent Application No. 2004-330650 filed on Nov. 15, 2004, the entire contents of which are incorporated by reference.

BACKGROUND OF THE INVENTION

1. Field of the Invention

The present invention relates to a cooking stove wherein a cooking container is put on a trivet and heated and cooked by a burner.

2. Description of the Related Art

Conventionally, in the field of cooking stoves, a gas table 1 as shown in FIG. 15 and FIG. 16 has been known. In the gas table 1, a burner 14 of a spontaneous combustion type Bunsen burner is arranged at the center position of an opening arranged in a top plate 12, and a drip plate 18 is put around the burner. A cooking container P is put on a trivet 20 arranged above around the burner 14, and heated by combustion of the burner 14. Reference number 15 denotes a burner main body, and 16 denotes a burner head.

The trivet 20 is integrally structured of plural L-shaped trivet claws 22 onto which the cooking container P is put and a trivet ring 21 to be the base of the respective trivet claws 22, and is put on the top plate 12.

In the inner circumferential side of the trivet ring 21, an inclined jaw portion inclined downward to the center of the ring (hereinafter, simply referred to as jaw portion) 21c is formed.

Between this trivet ring 21 and the top plate 12, and between the trivet ring 21 and the drip plate 18, a clearance gap for supplying secondary air is formed.

Further, in recent years, as shown in the Japanese Patent Application Laid-Open No. 2003-161449, a cooking stove has been in practical use wherein the trivet claws 22 are made low and the clearance gap between the burner 14 and the cooking container P is made small for improving the heating efficiency of the cooking container P.

In this cooking stove, as shown in FIG. 17, the jaw portion 21c of the trivet 20 is extended to the vicinity of a main flame port 16a of the burner head 16, and secondary air is supplied to the base of the flame to the tip thereof.

The combustion gas of the burner 14 is discharged to the outside through the clearance gap (ring-shaped combustion gas route) between the cooking container P and the trivet ring 21. Reference number 23 donates a protruded portion that is inserted into the top plate 12 and supports the trivet ring 21.

By this structure, while the combustion performance is preferably maintained, the height of the trivet claws 22 is lowered to make the cooking container P close to the burner head 16, and the combustion gas of the burner 14 is prevented from diffusing by means of the trivet ring 21. Thus, the combustion gas at high temperatures contact with the cooking container P precisely, thereby increasing the heating efficiency of the cooking container P.

On the other hand, in this kind of cooking stoves, there are cooking stoves characterized by the structure of the trivet concerning improvement of thermal efficiency.

For example, as shown in Japanese Utility Model Application Laid-Open No. H02-140210, a trivet is proposed to have a spiral partition wall on the top surface of the trivet ring, and in the center position of the partition wall, a protrusion protruding upward is arranged as a kettle loading portion.

Further, in the Japanese Patent Application Laid-Open No. 2003-166718, a cooking stove is proposed. Wherein, a direction of a flame of an outer flame type burner is inclined by a specified angle in the burner circumferential direction to the straight line connecting the center of the burner and a flame port, and the a trivet is formed so as to be inclined in the same manner. Thus, a distance in which the flame contacts with the cooking container can be made long.

However, in the cooking stove as disclosed in the Japanese Patent Application Laid-Open No. 2003-161449, a high temperature combustion gas is prevented from diffusing by the trivet ring 21, and accordingly, the temperature of the trivet ring 21 becomes extremely high. As a result, the combustion gas heat is dissipated through the trivet ring 21, which has been a problem. In particular, in a cooking stove of forced combustion type where combustion air is forcibly supplied to the burner 14, and the combustion gas of the burner 14 is forcibly exhausted, it is possible to make the distance between the burner 14 and the cooking container P further shorter. However, since the high temperature combustion gas goes through on the surface of the trivet ring 21, the rate of the heat that is dissipated from the rear surface of the trivet 21 to the outside increases further more.

Further, in the case when the height of the trivet claws 22 is made low in this manner, it is possible to increase the contact area of the cooking container P and the combustion flame, but on the other hand, the contact area of the trivet claws 22 on which the cooking container P is put and the combustion flame increases further more.

Accordingly, as the flame is cooled down by the trivet claws 22 to deteriorate the combustion property, carbon monoxide gas generates, which has been another problem.

Furthermore, the heat energy of the flame is absorbed by the trivet claws 22, the heat transmission efficiency to the cooking container P declines.

Moreover, since the trivet claws 22 are heated up by the combustion flame, the durability of the trivet 20 is lost, and there is a fear of a burn injury to its user, which has been still another problem.

Further, in those conventional cooking stoves, although it has been considered to make the cooking container P close to the burner head 16, it was not considered to further improve the heating efficiency by the way to flow the combustion gas in the ring-shaped combustion gas route formed between the upper surface of the trivet ring and the bottom surface of the cooking container P, and there is room for improvement.

In general, the combustion gas (including the flame) generated by a burner is discharged through the ring shaped combustion gas route to the outside, and while the combustion gas passes through the route, its temperature goes down and its volume flow rate decreases. Further, since the ring shaped combustion gas route has a cross sectional area which increases toward the outside, the speed of the combustion gas in the combustion gas route becomes slower, so that the heat flow is dissipated toward the outside.

On the other hand, the heat transmission rate between the combustion gas and the cooking container becomes preferable when the combustion gas is passed through narrow ring shaped combustion gas route.

As a result, in the conventional cooking stoves, the heat flow is dissipated more at the outside in the ring shaped combustion gas route and sufficient heat exchange cannot be made.

On the other hand, in the cooking stove wherein a natural combustion type burner that supplies air necessary for combustion by natural draft force is used, if the distance between the bottom surface of the cooking container P and the burner 14 is made short, and the combustion space is made narrow, the draft force is not formed and the supply and discharge of combustion air cannot be made smoothly. Therefore, there is a limitation to make the combustion space narrow, which means that the distance between the burner 14 and the cooking container P becomes wide, so that the contact area of the combustion flame and the bottom surface of the cooking container P cannot be increased. Further, since the combustion space must be made wide, the combustion heat is dissipated unnecessarily in the combustion space, and the combustion heat is cooled down by ambient air flowing into the combustion space. Consequently, desired heating efficiency cannot be obtained.

Furthermore, even if the combustion gas flow is controlled so that the combustion gas is efficiently guided to the cooking container P for the purpose of improving the heating efficiency, it is difficult to control the combustion gas flow by only the natural draft force.

Accordingly, before the combustion heat is transmitted to the cooking container P sufficiently, the combustion gas is discharged to the outside, and there is a limitation in improvement of heating efficiency.

In the trivet of the Japanese Utility Model Application Laid-Open No. H02-140210, the cooking container is put on the protrusion arranged in the partition wall, the combustion gas route between the bottom surface of the cooking container and the trivet ring is not separated but interconnected at the upper portion. Therefore, the combustion gas (including the flame) of the burner does not circulate but just flows in the emission direction at the bottom surface of the cooking container.

Further, in the burner of the Japanese Patent Application Laid-Open No. 2003-166718, the jetting direction of the combustion gas is inclined and the trivet claws are formed so as to be inclined in the same direction. Accordingly, the combustion gas just flows diagonally to the emission direction, and the combustion gas does not sufficiently contact with the cooking container.

Namely, in any of these burners, the combustion gas flows under the cooking container in laminar flow state to the outside.

In this case, on the bottom surface of the cooking container, a heat transmission border film of a thin air layer is formed, and which works as a heat insulation layer. Thus, the heat transmission of the combustion gas to the cooking container has not been achieved.

As a result, it has been impossible to obtain high heating efficiency.

Accordingly, the object of the present invention is to solve the above problems with the prior art, and to eliminate energy loss arising from the trivet structure and the kinds of burners and obtain high heating efficiency.

SUMMARY OF THE INVENTION

In order to achieve the above object, according to a first aspect of the present invention, there is provided a cooking stove comprising a burner that heats a cooking container from below, and a ring plate that is arranged around the burner, wherein a ring shaped combustion gas route is formed between the upper surface of the ring plate and the bottom surface of the cooking container, and wherein in the combustion gas route, an exhaust guide that makes the combustion gas of the burner flow along the bottom surface of the cooking container in spiral circulation shape toward the outer circumferential direction is arranged.

Furthermore, in order to achieve the above object, according to a second aspect of the present invention, there is provided a cooking stove according to the first aspect, wherein the ring plate is a trivet ring which has on its upper surface trivet claws for supporting the bottom surface of the cooking container as well as functioning as the exhaust guide, and the trivet claws are formed in a spiral shape extending from the inside to the outside when viewed from above, and is formed of a plate shaped wall standing from the upper surface of the trivet ring from the inside end to the outside end, and when the cooking container is put thereon, the upper ends of the trivet claws spirally contact with the bottom surface of the cooking container, and the ring shaped combustion gas route is sectionally formed in the spiral gas route surrounded by the upper surface of the trivet ring and the trivet claws and the bottom surface of the cooking container.

Moreover, in order to achieve the above object, according to a third aspect of the present invention, there is provided a cooking stove according to the second aspect, wherein the trivet claws are formed integrally with the trivet ring.

Further, in order to achieve the above object, according to a fourth aspect of the present invention, there is provided a cooking stove according the second or third aspect, wherein the inner circumferential upper end of the trivet claws is formed lower than the outer circumferential upper end of the trivet claws.

Furthermore, in order to achieve the above object, according to a fifth aspect of the present invention, there is provided a cooking stove according to any of the first to fourth aspects, wherein a cross sectional area of the ring shaped combustion gas route becomes smaller as the distance of the ring plate from the center becomes farther, or, the cross sectional area is same even when the distance becomes farther.

Moreover, in order to achieve the above object, according to a sixth aspect of the present invention, there is provided a cooking stove according to any of the first to fifth aspects, wherein the burner is an external flame port burner where many flame ports are arranged in the outer circumferential direction, and a direction of a flame jetted from the flame ports is inclined by a specified angle in the burner circumferential direction to the straight line extending in a radial direction from the center of the burner.

Still further, in order to achieve the above object, according to a seventh aspect of the present invention, there is provided a cooking stove according to any of the first to sixth aspects, wherein heat dissipation repressing means for repressing heat dissipation from the rear surface of the ring plate is provided.

According to the cooking stove described in the first aspect of the present invention, the combustion gas jetting from the burner is guided in a spiral shape by the exhaust guide, and exhausted along the bottom surface of the cooking container toward the outer circumferential direction. As a result, in the combustion gas route, the combustion gas is always subject to a force to change directions and the flow thereof is disturbed. Accordingly, a heat transmission border film (thin air heat insulation layer) is unlikely to be formed on the bottom surface of the cooking container, and the heat of the combustion gas is transmitted to the bottom surface of the cooking container preferably.

Further, a distance in which the combustion gas contacts with the bottom surface of the cooking container can be made long.

As the result of these, high heating efficiency is obtained.

Furthermore, according to the cooking stove described in the second aspect of the present invention, the combustion gas of the burner flows into the combustion gas route sectionally formed in the spiral shape, and hits the trivet claws and goes through them. When the combustion gas hits the trivet claws, a flow of the gas is changed from the horizontal direction to the upward direction, and hits the bottom surface of the cooking container. Therefore, the heat transmission efficiency between the cooking container bottom surface and the combustion gas improves.

Moreover, when the combustion gas reaches the outer circumferential portion from the cooking container, it hits the spiral trivet claws and is sent upward, and flows along the cooking container side surface.

Therefore, in addition to the cooking container bottom surface, in the cooking container side surface too, the heat exchange with the combustion gas is carried out preferably.

And further, as described above, since the trivet claws that support the cooking container is used also as an exhaust guide for guiding the flow of the combustion gas, there is no need to arrange a special exhaust guide, and therefore, it is possible to reduce the production costs.

Moreover, according to the cooking stove described in the third aspect of the present invention, the number of parts becomes smaller, which simplifies the structure and reduces the costs.

Further, according to the cooking stove described in the fourth aspect of the present invention, the inner circumferential upper end of the spiral trivet claws is formed lower than the outer circumferential upper end.

The cooking container is generally round at the bottom. That is, the center portion of the bottom of the cooking container positions lower than the outer circumferential portion of the bottom.

Accordingly, in the case when the upper ends of the trivet claws are made all same, a clearance gap is formed between the cooking container and the upper ends of the trivet claws at the outer circumferential side. In this case, since the combustion gas diffuses to the outside through between the cooking container and the upper portions of the trivet claws, and the combustion gas is not formed into a spiral shape, whereby a desired heating efficiency cannot be obtained.

On the other hand, in the present invention, the inner circumferential upper end of the spiral trivet claws is formed lower than the outer circumferential upper end, and accordingly, it is possible to reduce the clearance gap between the trivet claw upper ends and the cooking container bottom surface. Therefore, the combustion gas forms an ideal spiral shape, and it is possible to improve the heat transmission efficiency between the combustion gas and the cooking container.

Furthermore, according to the cooking stove described in the fifth aspect of the present invention, the ring plate is formed so that the route cross sectional area of the ring shaped combustion gas route becomes smaller as the distance of the ring plate from the center becomes farther, or, the route cross sectional area is same even when the distance becomes farther.

This route cross sectional area A is the area of the surface orthogonal to the flow of the combustion gas in the combustion gas route sectionally formed into spiral shape, and when the distance from the center of the ring plate is defined as r, and the distance (height) between the ring plate and the cooking container bottom surface is defined as h, then the area can be expressed by $A=2\pi rh$.

The combustion property of the fuel gas in the burner becomes further preferable as the combustion space is wider.

On the other hand, the heat transmission efficiency between the combustion gas and the cooking container becomes more preferable as the combustion gas flow rate becomes faster, that is, the combustion gas route cross sectional area is narrower.

In the present invention, the route cross sectional area of the combustion gas route is made narrower as the distance from the burner becomes farther, and at the position where the distance from the burner is close, that is at the position close to the combustion space, it is possible to keep the combustion gas route wide enough not to lose the combustion property of the burner, and at the position far away from the burner, by making the route cross sectional area of the combustion gas route narrow, it is possible to improve the heat transmission efficiency between the combustion gas and the cooking container.

Further, the volume flow rate of the combustion gas decreases along with the temperature decline of the combustion gas as the distance from the burner becomes farther. Therefore, in cooking stoves like the conventional ones, wherein the cross sectional area of the combustion gas route becomes wider as the distance from the burner becomes farther, the combustion gas decelerates further and diffuses more, and the heating efficiency declines.

In the present invention, the route cross sectional area of the combustion gas route is not made wider as the distance from the burner becomes farther, therefore, it does not cause the decline in the combustion gas flow rate along with the decrease of the volume flow rate of the combustion gas. Accordingly, it does not cause the decline of heating efficiency due to the diffusion of the combustion gas.

Moreover, according to the cooking stove described in the sixth aspect of the present invention, since a direction of a flame jetted from the flame port is inclined, the combustion gas of the burner flows among the trivet claws for a while after jetting, then hits the trivet claws and flows toward the outer circumferential direction.

Accordingly, the combustion gas after complete combustion is made to hit the trivet claws, it is possible to maintain the combustion preferably. In other words, if the combustion gas is made to hit the trivet claws just after jetting, the flame temperature goes down and incomplete combustion occurs, but by making the combustion gas hit the trivet claws at appropriate timing, it is possible to maintain the combustion preferably.

Further, for a while after jetting until hitting the trivet claws, it is possible to maintain the jetting speed fast, and the combustion gas is unlikely to become a laminar flow, and it is possible to further improve the heating efficiency.

Further, according to the cooking stove described in the seventh aspect of the present invention, the heat dissipation repressing means represses the heat dissipation from the under surface of the trivet ring, and it is possible to prevent the temperature decline of the combustion gas of the burner.

Accordingly, the combustion gas heat can be used effectively for heating the cooking container, and it is possible to improve the heating efficiency further more.

Furthermore, it is possible to prevent the cooking environment from being deteriorated by heat dissipation from the trivet.

DETAILED DESCRIPTION OF THE INVENTION

In order to further clarify the structures and operation of the present invention explained above, preferred embodiments in a cooking stove of the present invention are explained hereinafter.

Meanwhile, an identical code is allotted to the point duplicated with the conventional example, and explanations thereof are omitted.

First Preferred Embodiment

Figure 1:
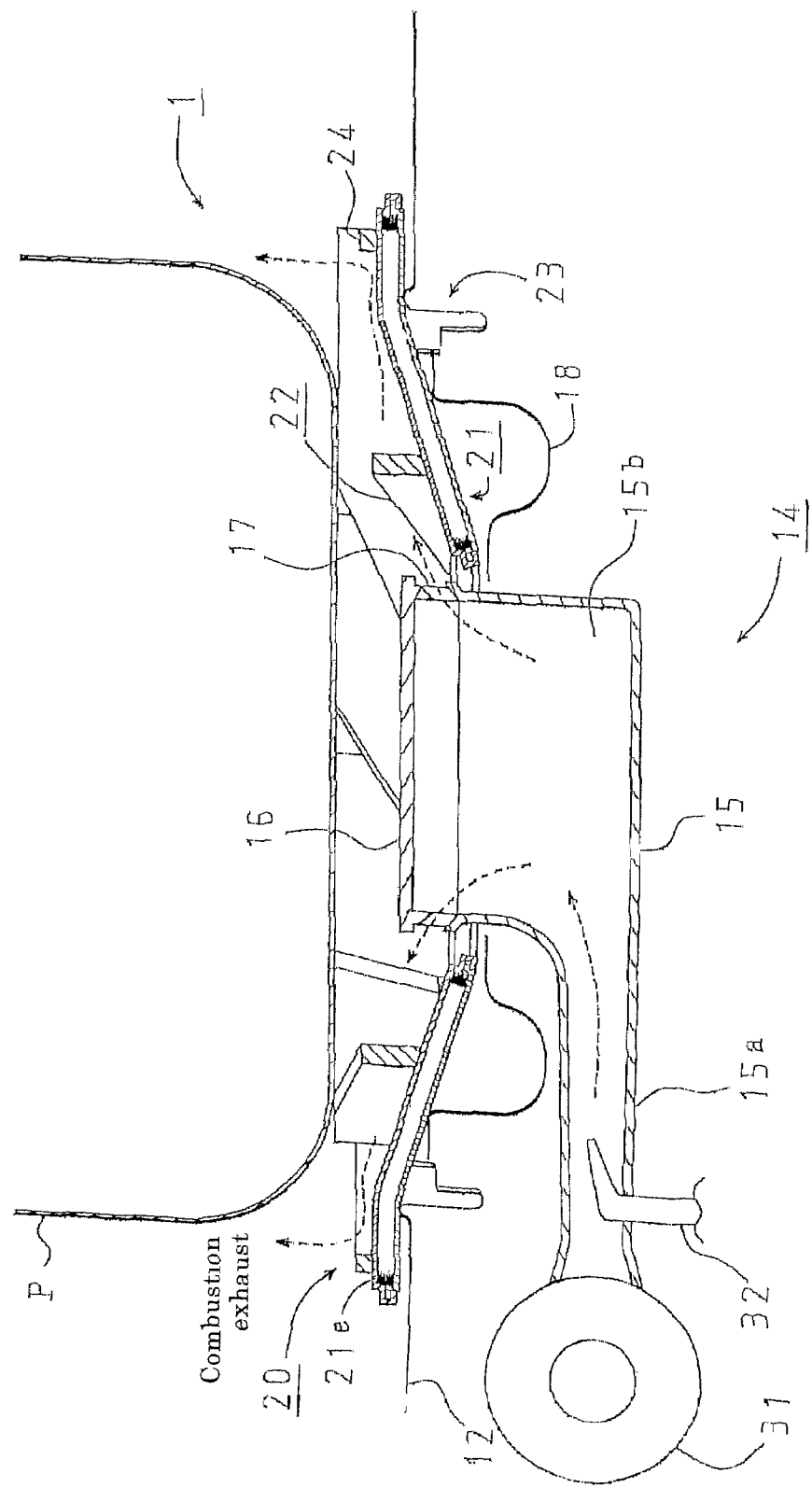
FIG. 1 is an explanatory figure showing the function of a gas table according to a first preferred embodiment.
Figure 2:
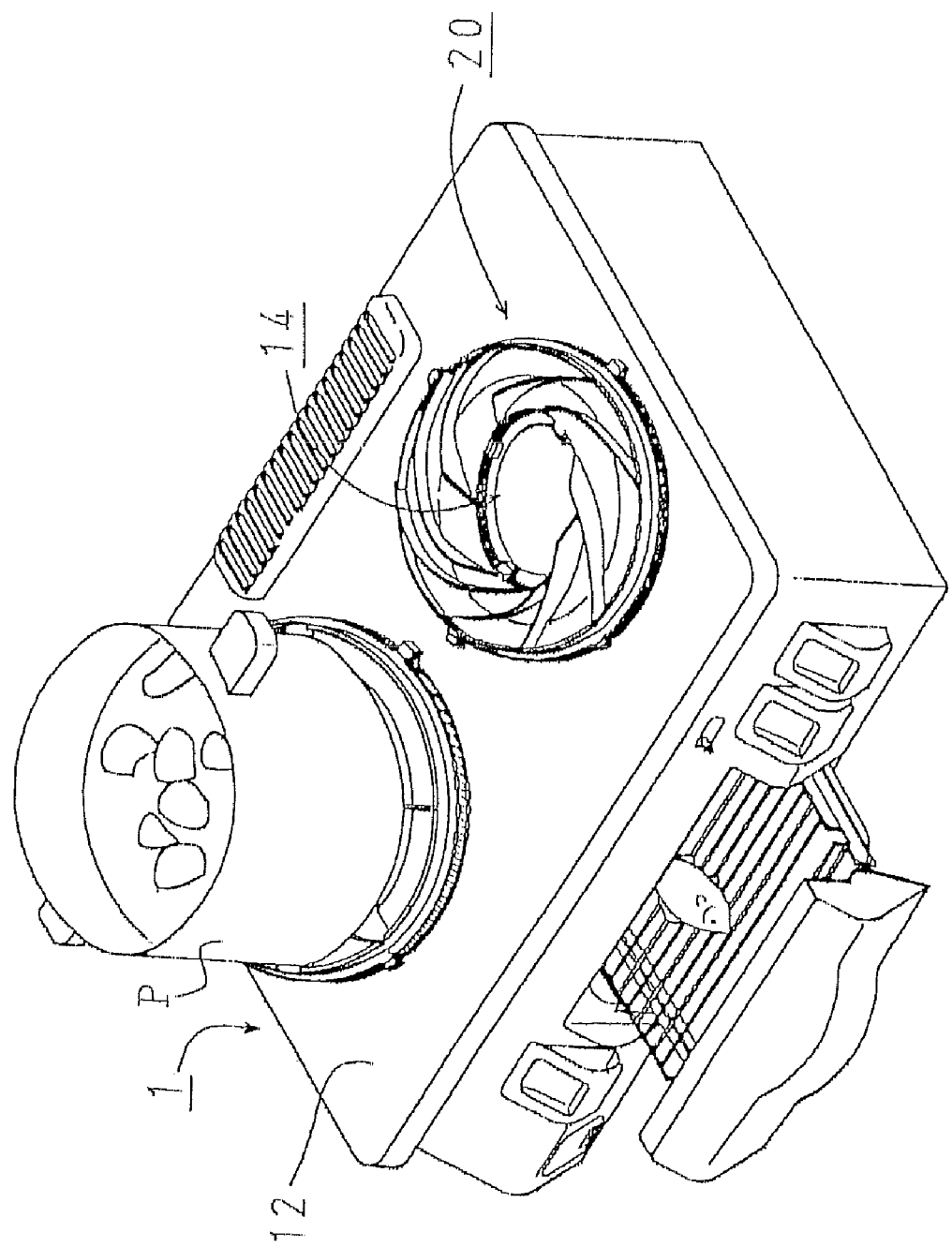
FIG. 2 is a perspective view showing a gas table according to a first preferred embodiment.

In a gas table 1 as a cooking stove, as shown in FIG. 1 and FIG. 2, an opening is arranged in a top plate 12, and at the center position of the opening, a cylindrical burner 14 is arranged, and a drip plate 18 is put around the burner. Above around the burner 14, a trivet 20 for putting a cooking container P thereon is arranged.

The burner 14 is an all primary air type burner that takes in almost of all the air necessary for combustion as primary air, and has a burner main body 15 that mixes fuel gas and combustion air, and a burner head 16 that is put onto the burner main body 15.

In the burner main body 15, at the upstream end, an air supply fan 31 for supplying combustion air is connected, and in the course of the air supply route, a gas nozzle 32 that jets out fuel gas is arranged. At the downstream of the gas nozzle 32, a mixing pipe 15a for mixing the fuel gas and the combustion air is formed. Further, at the head of the burner main body 15, a cylindrical mixing chamber 15b is formed, and a burner head 16 is put coaxially on the mixing chamber 15b.

Figure 3:
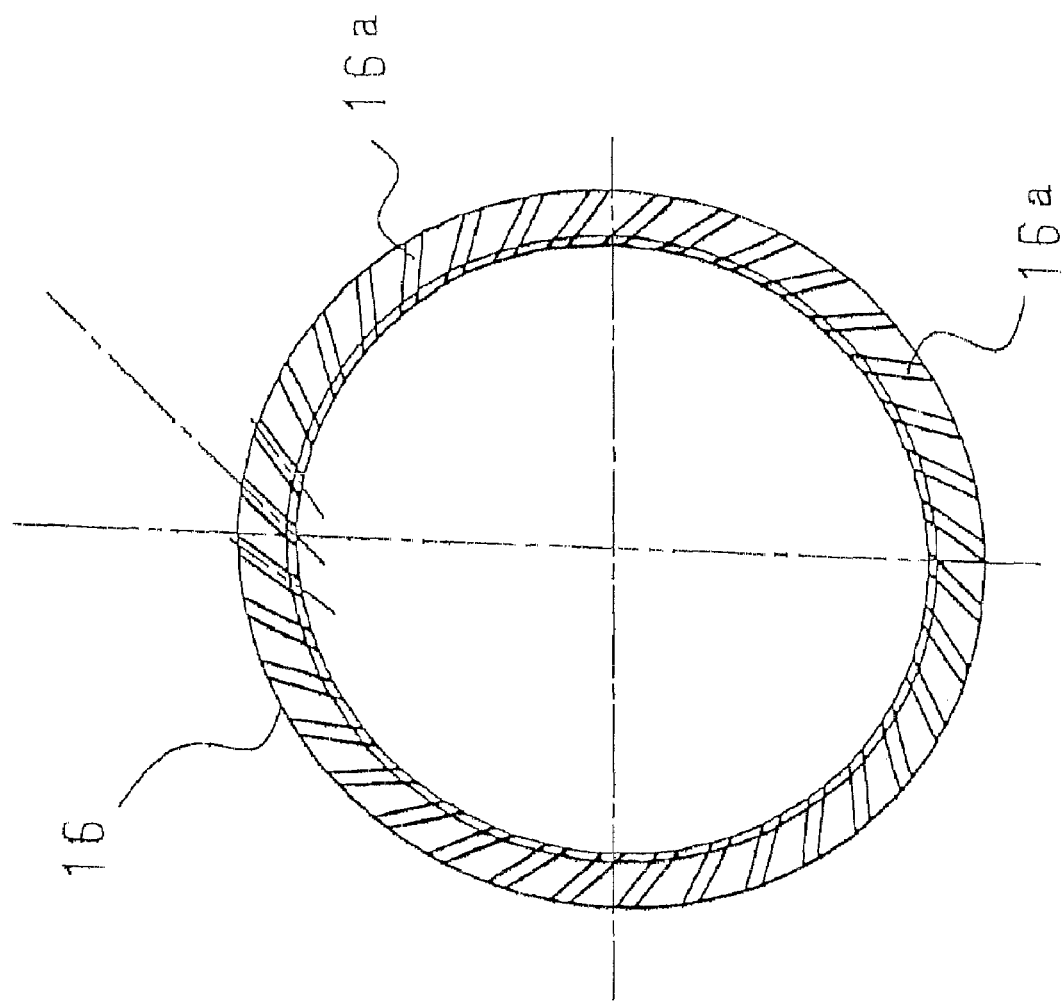
FIG. 3 is a figure showing the bottom surface of a burner head according to a first preferred embodiment.

The burner head 16, as shown in FIG. 1 and FIG. 3, is formed into a disk shape, and in the outer circumference thereof that forms a mating surface with the burner main body 15, many flame port slots 16a are formed, and by putting the same on the mixing chamber 15b of the burner main body 15, many flame ports 17 are formed on the outer circumference. The flame port slots 16a are directed diagonally upward toward the outside, and are inclined in the burner circumferential direction by a specified angle to the straight line extending in a radial direction from the center of the burner 14 (the center of the burner head 16).

Figure 4:
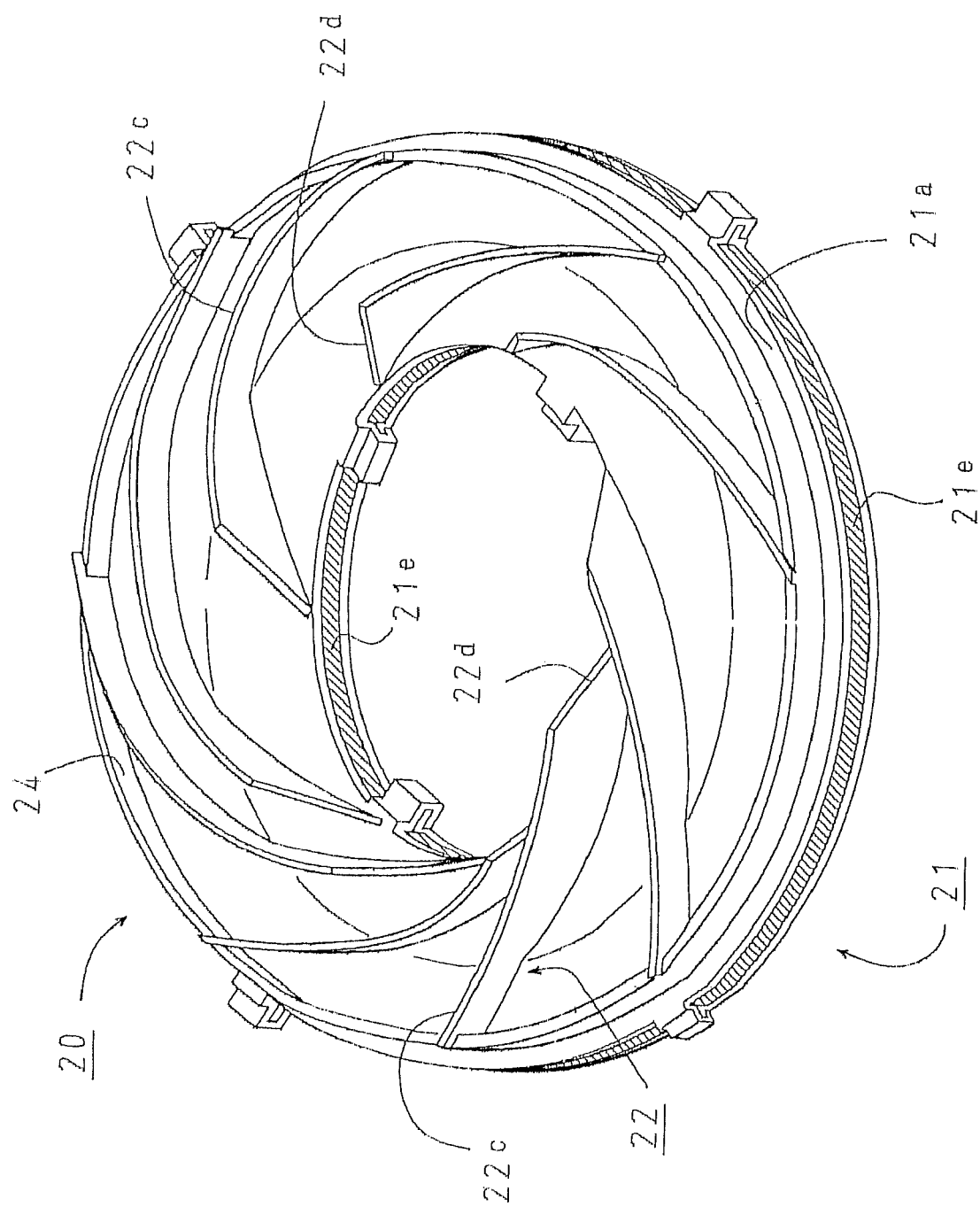
FIG. 4 is a perspective view showing a trivet according to a first preferred embodiment.
Figure 5:
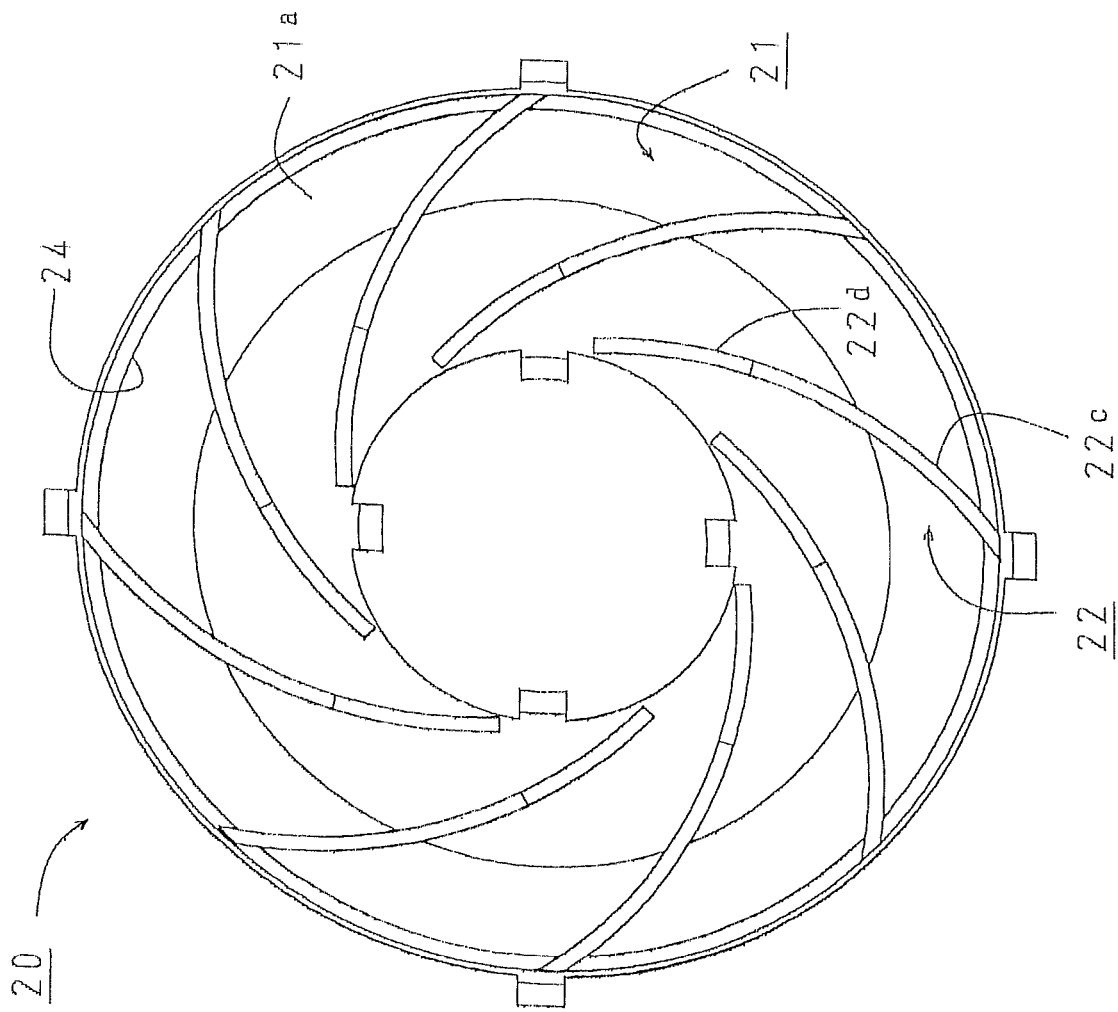
FIG. 5 is a top view showing a trivet according to a first preferred embodiment.
Figure 6:
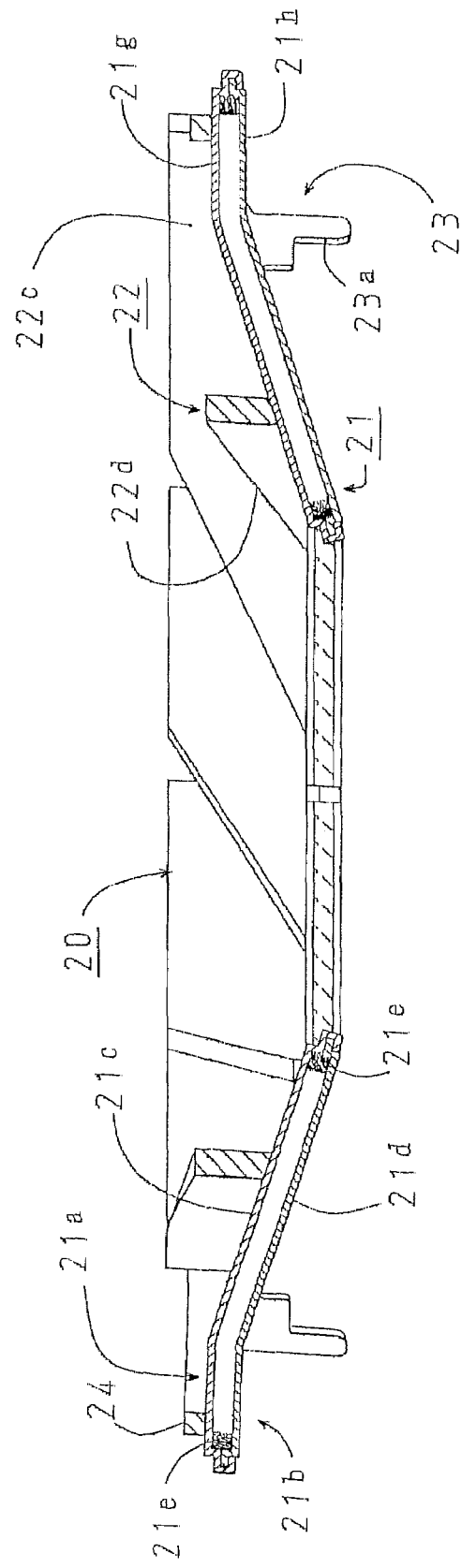
FIG. 6 is a cross sectional view showing a trivet according to a first preferred embodiment.

Next, the structure of the trivet 20 is explained with reference to FIG. 4 through FIG. 6.

The trivet 20 is integrally structured of plural trivet claws 22 that support the cooking container P, a trivet ring 21 that is arranged around the burner 14 and covers the overlap upper portion of the opening of the top plate 12 and the drip plate 18 and becomes the base on which the trivet claws 22 are arranged, a ring shaped current plate 24 that is protruded upward on the upper surface of the outer circumferential portion of the trivet ring 21, and a protruded portion 23 that fixes the trivet 20 main body onto the top plate 12.

The trivet ring 21 is of a ring plate shape, and forms a ring shaped combustion gas passing route with the cooking container P bottom surface to contact the upper surface of the trivet claws 22 and guides the combustion gas to the outside.

The trivet ring 21 is of a double structure formed of a front plate 21a to face the cooking container P, and a back plate 21b to face the drip plate 18 and the top plate 12.

The front plate 21a, and the back plate 21b respectively have horizontal surface portions 21g, 21h at the outer circumferential side, and at the inner circumferential side, inclined jaw portions 21c, 21d inclined downward to the center of the ring are arranged. The ends of the inclined jaw portions 21c, 21d are arranged close to the outer circumferential side surface of the burner 14, and a clearance gap is hardly formed between the trivet ring 21 and the burner 14.

Accordingly, the upper and under surfaces are covered with the trivet ring 21 upper surface and the burner 14 and the cooking container P bottom surface and the combustion gas route (including the combustion area of the burner 14) into which ambient air hardly flows is formed.

Further, in the ring shaped combustion gas route whose upper and under surfaces are covered with the trivet ring 21 upper surface around the burner 14 and the cooking container P bottom surface, the angles of the inclined jaw portions 21c, d are set so that the route cross sectional area A becomes narrower as the distance from the burner 14 becomes farther.

That is, when the distance from the center of the burner (the center of the trivet ring) is defined as r, and the height from the trivet ring 21 to the cooking container P bottom surface is defined as h, then the area can be expressed as below $$A = 2\pi rh$$

and h is set, that is, the angles of the inclined jaw portions 21c, 21d are set so that the route cross sectional area A becomes smaller at the place where r becomes larger.

Furthermore, the front plate 21a and the back plate 21b of the trivet ring 21, at the entire outer circumferential end portion and the entire inner circumferential end portion, with ceramics 21e as heat insulation materials inserted respectively, are fixed by caulking at four positions respectively in the outer circumferential end portion and the inner circumferential end portion.

The trivet claws 22 are arcuate plate-like vertical walls, and extending from an upper surface of the trivet ring 21 from the inside end to the outside end of the trivet ring 21. The trivet claws 22 are inclined at a specified angle in the burner circumferential direction to the straight line directed radially from the center of the burner 14 (the center of the trivet ring 21).

Accordingly, by arranging the trivet claws 22 on the trivet ring 21 upper surface at a specified interval (specified angle pitch at ring center), the trivet claws 22 are formed on the trivet ring 21 upper surface in spiral shape when viewed from above.

This trivet claw 22 is structured of an inclined portion 22*d* at the inner circumferential side, and a cooking container loading portion 22*c* at the outer circumferential side.

The inclined portion 22*d* is inclined so that the upper end surface becomes higher from the inside end to the outside direction.

The upper end surface of the cooking container loading portion 22*c* is formed roughly horizontally, and becomes the portion onto which the cooking container P is put.

The respective trivet claws 22 are of the same shape, and the upper end of the cooking container loading portion 22*c* is positioned on a same horizontal surface, and directly contacts the bottom surface of the cooking container P on the curve extending in an arc shape, and divides the left and right space.

Then, the ring shaped combustion gas route is divided, by the trivet claws 22, into plural combustion gas routes sectioned into a spiral shape.

According to the gas table 1 described above, the combustion gas (including the flame) is jetted from the flame port 17 of the burner 14 diagonally upward entirely twisted in the burner circumferential direction. Then, the combustion gas flows into plural combustion gas routes sectioned into spiral shape, and hits the trivet claws 22 and goes through. When the combustion gas hits the trivet claws 22, the combustion gas changes its flow from the horizontal direction to the upward direction, and repeats hitting the cooking container P bottom surface and is sent to the outside.

That is, the trivet claws 22 works as an exhaust guide that guides the flow of the combustion gas of the burner 14, and the combustion gas is guided in spiral shape by the trivet claws 22, and exhausted along the cooking container P bottom surface toward the outer circumferential direction. As a result, in the combustion gas route, the combustion gas is always subject to direction changing force and the flow thereof is disturbed, and accordingly, a heat transmission border film is unlikely to be formed on the cooking container P bottom surface, and the heat of the combustion gas is transmitted to the bottom surface of the cooking container preferably.

Further, a distance in which the combustion gas contacts with the bottom surface of the cooking container P can be made long.

As a result, high heating efficiency is obtained.

And further, since the trivet claws 22 that support the cooking container P is used also as an exhaust guide for guiding the flow of the combustion gas, there is no need to arrange a special exhaust guide, and therefore, it is possible to reduce the production costs.

Furthermore, in the case where the size of the cooking container P is smaller than the diameter of the trivet ring 21, when the combustion gas reaches the outer circumferential portion from the cooking container P, it hits the spiral trivet claws 22, and is sent upward as it is, and flows along the cooking container P side surface, therefore, in addition to the cooking container P bottom surface, in the cooking container P side surface too, the heat exchange with the combustion gas is carried out preferably.

Moreover, since the trivet claws 22 extend outward in arc shape, and the entire trivet ring 21 surface is formed into a spiral shape, the combustion gas hits the trivet claws 22 side walls and is sent, to the outside smoothly, and there is little exhaust resistance even when the contact distance with the cooking container P bottom surface is long, and there is little bias in the heat distribution.

Further, since a direction of a flame jetted from the burner 14 is inclined to the circumferential direction of the burner 14, the combustion gas of the burner 14 flows among the trivet claws 22, 22 for a while after jetting, then hits the trivet claws 22 and flows toward the outer circumferential direction.

Accordingly, the combustion gas after complete combustion is made to hit the trivet claws 22, it is possible to maintain the combustion preferably. In other words, if the combustion gas is made to hit the trivet claws 22 just after jetting, the flame temperature goes down and incomplete combustion occurs, but by making the combustion gas hit the trivet claws at appropriate timing, it is possible to maintain the combustion preferably.

Further, for a while after jetting until hitting the trivet claws 22, it is possible to maintain the jetting speed fast, and the combustion gas is unlikely to become a laminar flow, and it is possible to further improve the heating efficiency.

Furthermore, when the jetting speed is fast because the outer diameter of the burner 14 is made to be small so as to narrow an area of the flame port, the heating efficiency is further improved.

Moreover, the combustion gas of the burner 14 is made to go through the combustion gas routes covered with the burner 14 and the trivet ring 21 and the cooking container P bottom surface almost without a clearance gap, and the combustion gas is exhausted from the outer circumferential portion, and accordingly, ambient air does not flow into the combustion gas routes, and it is possible to prevent the combustion heat from being cooled down by ambient air.

Further, the inclined jaw portion 21*c* is arranged in the trivet ring 21, and the route area of the combustion gas route is made narrower as the distance from the burner 14 becomes farther, and accordingly, at the portion where the distance from the burner 14 is near, that is, at the portion close to the combustion space, the combustion property of the burner 14 is not deteriorated, and at the portion far away from the burner 14, by making narrower the route area of the combustion gas route, it is possible to make the flow rate of the combustion gas fast.

Accordingly, it is possible to maintain the combustion property of the burner 14 preferably, and improve the heat transmission efficiency between the cooking container P and the combustion gas.

Further, the volume flow rate of the combustion gas decreases along with the temperature decline of the combustion gas as the distance from the burner 14 becomes farther. Therefore, when the area of the combustion gas route does not change even if the distance from the burner 14 becomes farther, the combustion gas decelerates and diffuses, and the heating efficiency declines, but in the present invention, the route cross sectional area of the combustion gas route is made narrower as the distance from the burner 14 becomes farther, therefore, it does not cause the decline in the combustion gas flow rate along with the decrease of the volume flow rate of the combustion gas.

Accordingly, the combustion heat at high temperature does not diffuse in the combustion gas route, and the combustion heat can be transmitted to the cooking container P efficiently.

Furthermore, since the forced combustion method is adopted, it is possible to maintain the preferable combustion performance even if the degree of airtightness of the combustion gas route is made high and the exhaust resistance becomes high.

Moreover, by the current plate 24 arranged on the outer circumferential end of the trivet ring 21, the flow of the combustion gas changed upward precisely over the entire circumference thereof.

Figure 7:
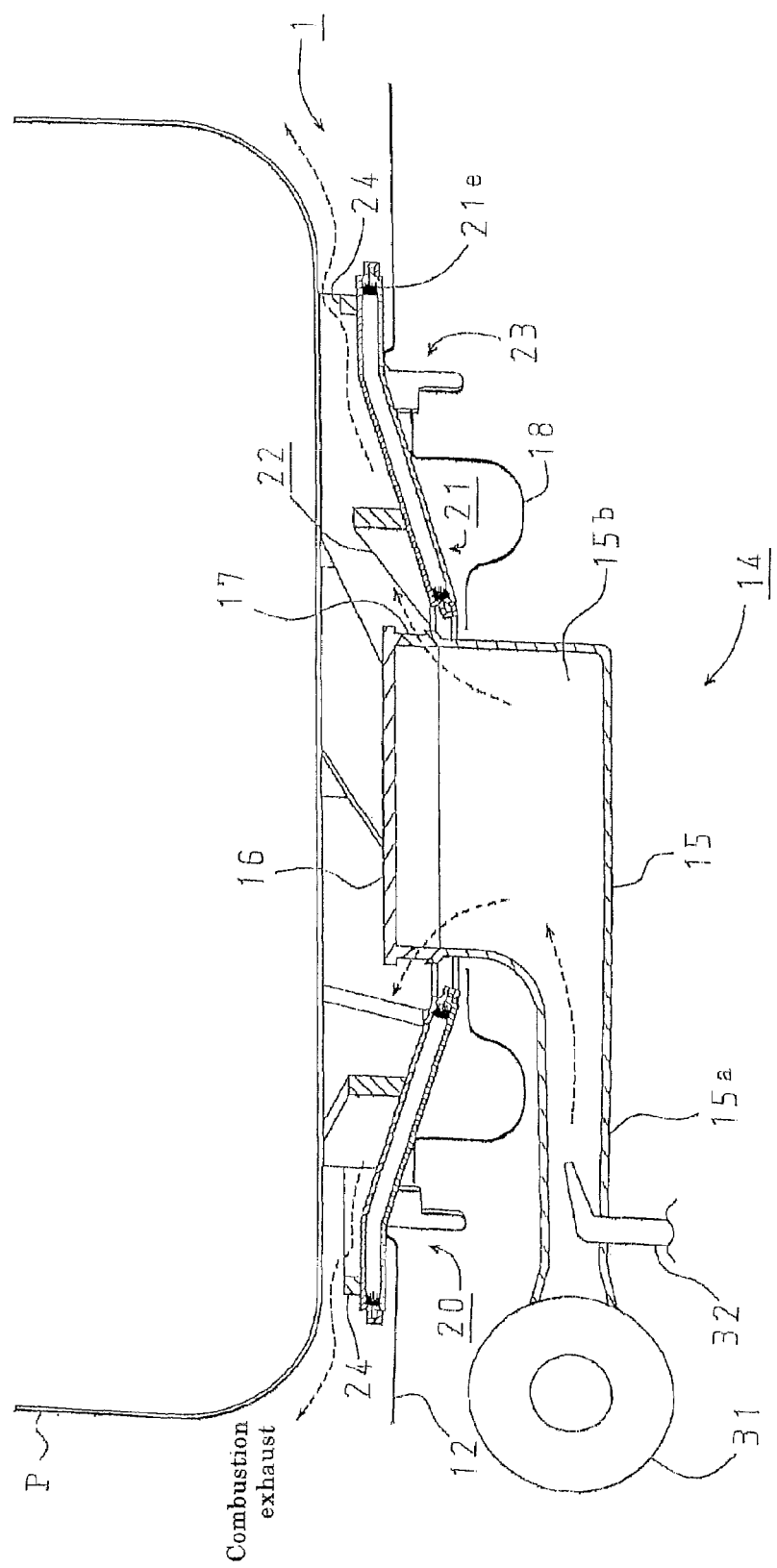
FIG. 7 is an explanatory figure showing the function of a gas table according to a first preferred embodiment.

Accordingly, when the diameter of the cooking container P is larger than the current plate 24, as shown in FIG. 7, after the combustion gas hits the cooking container P bottom surface, the combustion gas goes through the clearance gap between the current plate 24 upper end surface and the cooking container P bottom surface and is discharged to the outside. Accordingly, it is possible to improve the heat transmission efficiency between the combustion gas and the cooking container P bottom surface.

Further, when the diameter of the cooking container P is smaller than the current plate 24, although the combustion gas is sent upward while passing the combustion gas route sectionally formed by the spiral trivet claws 22, part thereof may not be sent upward but reach the current plate 24. In such a case too, the combustion gas is guided upward by the current plate 24.

Accordingly, the heat transmission efficiency between the combustion gas and the cooking container P side surface improves.

As the result of these, the heating efficiency is extremely improved.

Furthermore, since the inclined portion 22d where the upper portion of the inside of the trivet claw 22 is cut diagonally is formed, the trivet claws 22 is not burnt directly by the flame. Therefore, there is not a case where the flame is cooled down by the trivet claws 22, the combustion property is deteriorated, and carbon monoxide gas is generated. Further, there is not a case where the durability of the trivet 20 is lost.

Moreover, in the trivet ring 21 that faces the cooking container P and forms the combustion gas route, the double structure is formed of the front plate 21a that directly contacts the combustion gas at high temperature, and the back plate 21b that does not directly contact the burner combustion gas, and accordingly, the clearance gap formed between the front plate and the back plate works as a heat insulation layer, and the heat of the burner 14 combustion gas transmitted to the front plate 21a is not dissipated from the back surface.

Further, at the entire outer circumferential end portion and the entire inner circumferential end portion, the ceramics 21e are inserted into between the front plate 21a and the back plate 21b, and the connection portions (caulking fixed portions) of the front plate 21a and the back plate 21b of the trivet ring 21 are made at four positions respectively in the outer circumferential end portion and the inner circumferential end portion, and accordingly, it is possible to prevent the combustion gas heat, which is transmitted to the front plate 21a, from being transmitted to the back plate 21b through the inner circumferential and outer circumferential end portions.

According to the structure explained above, it is possible to prevent the temperature of the burner combustion gas from declining, and to use the combustion gas heat of the burner 14 effectively for heating the cooking container P.

Thereby, it is possible to improve the heating efficiency, and prevent the cooking environment from being deteriorated due to the heat dissipation from the trivet 20.

Second Preferred Embodiment

Next, a gas table according to a second preferred embodiment is explained hereinafter. Meanwhile, portions different from the first preferred embodiment are explained, and an identical code is allotted to the point duplicated with the first preferred embodiment, and explanations thereof are omitted.

Figure 8:
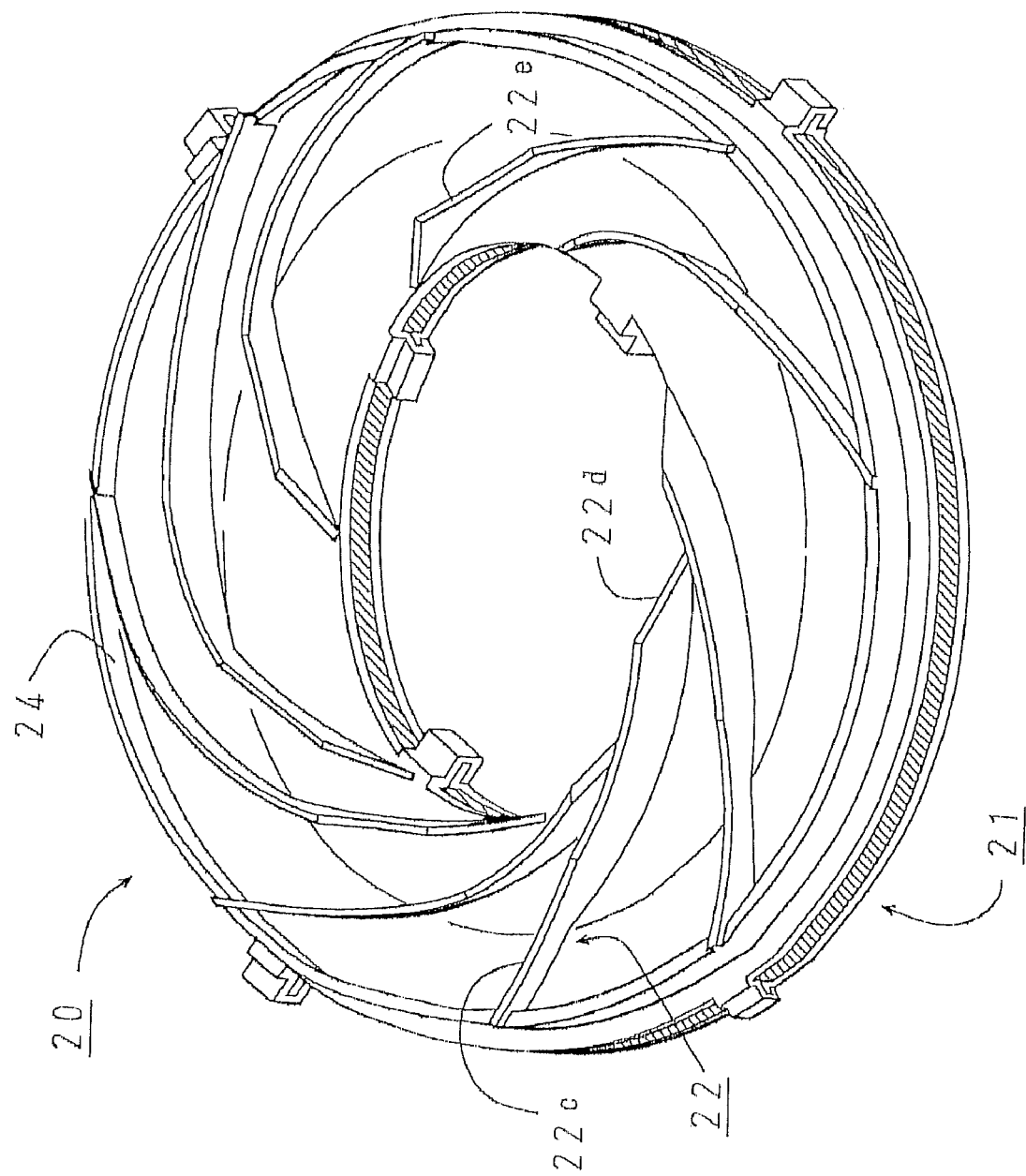
FIG. 8 is an explanatory figure showing a trivet according to a second preferred embodiment.
Figure 9:
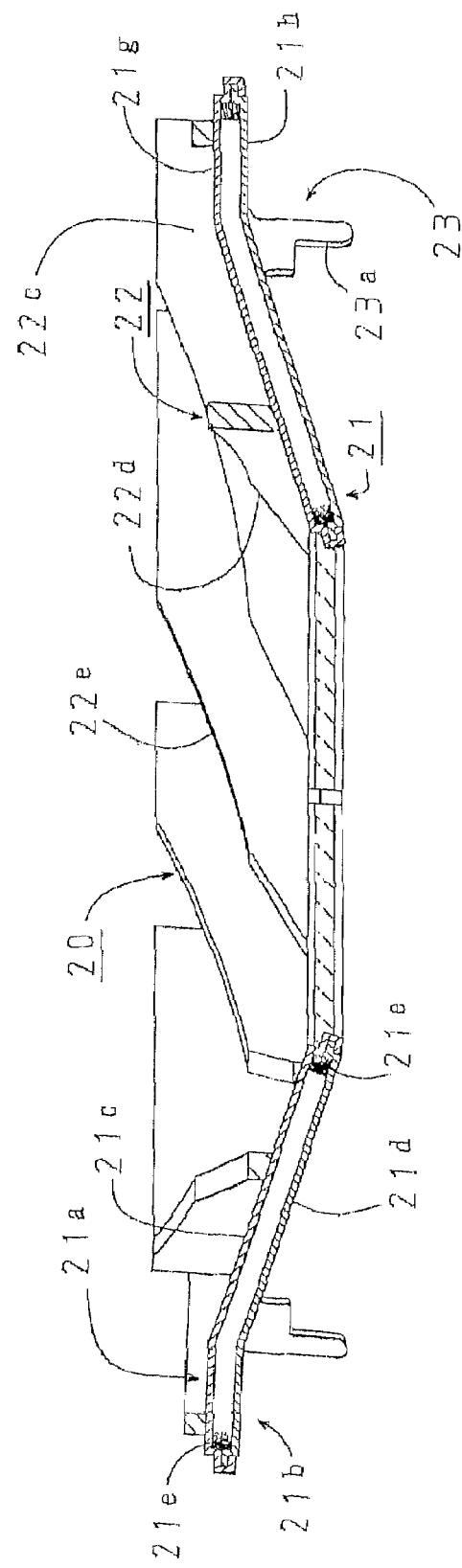
FIG. 9 is a cross sectional view showing a trivet according to a second preferred embodiment.
Figure 10:
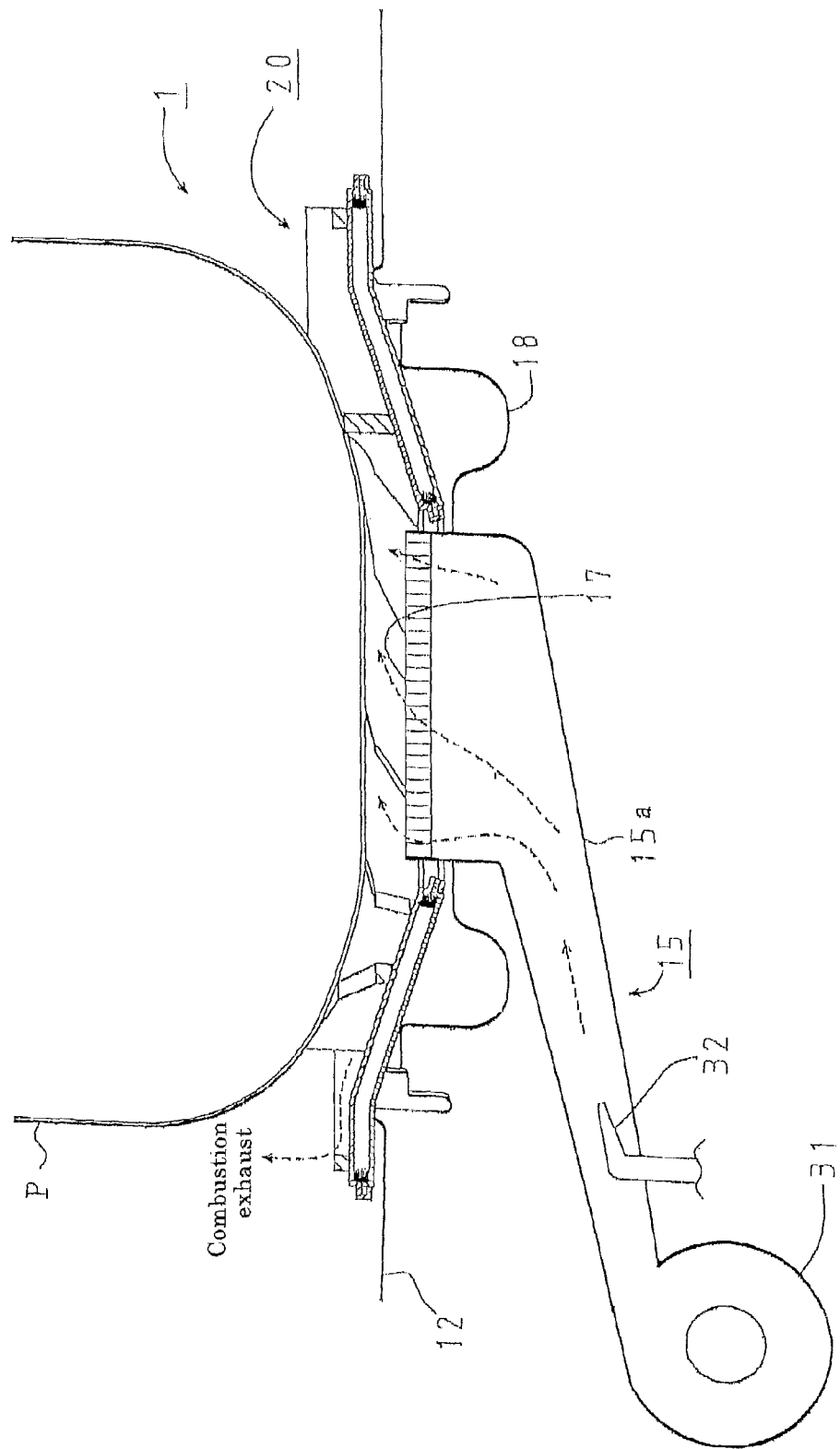
FIG. 10 is a cross sectional view showing a gas table according to a second preferred embodiment.

In the gas table 1 according to the second preferred embodiment, with regard to the shape of the trivet claws to load the cooking container thereon, as shown in FIG. 8 through FIG. 10, an arc portion 22e is arranged between the inclined portion 22d and the cooking container loading portion 22c.

The upper end surface of the arc portion 22e is arranged so as to become higher from the inside end to the external direction, and is concaved downward.

In general, the cooking container P is round at the bottom.

Figure 11:
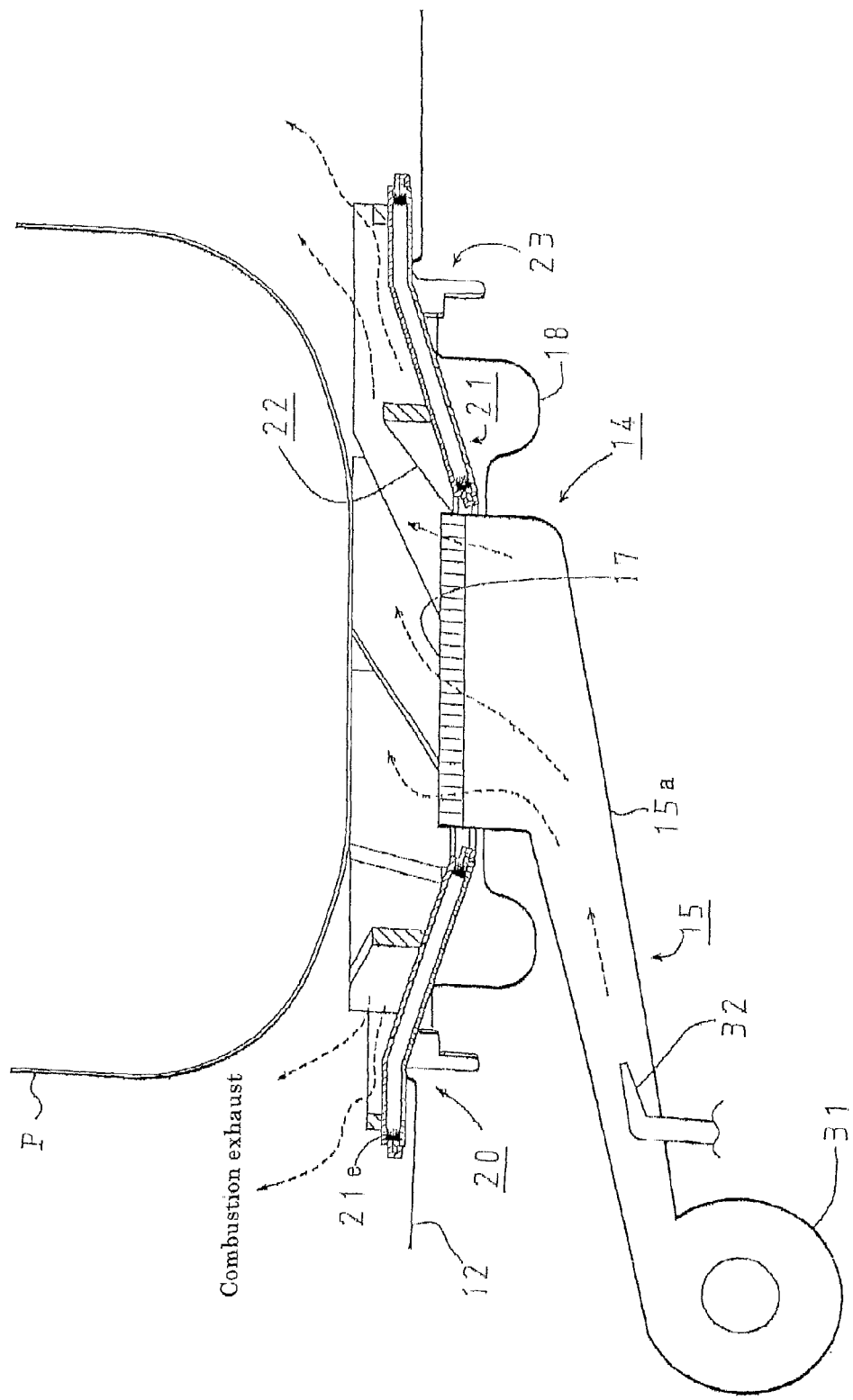
FIG. 11 is a cross sectional view showing a gas table compared in a second preferred embodiment.

In the case where the cooking container P having a round bottom surface is put on the cooking container loading portion 22a of the trivet claws 22 whose upper end surface is horizontal, as shown in FIG. 11, a clearance gap is formed between the cooking container P and the upper ends of the trivet claws 22 at the outer circumferential side. In this case, the combustion gas diffuses to the outside through between the cooking container P and the upper portions of the trivet claws 22, and is not formed into a spiral shape, and desired heating efficiency cannot be obtained.

On the other hand, in the present invention, the arc portion 22e is arranged between the inclined portion 22d and the cooking container loading portion 22c, and accordingly as shown in FIG. 10, a clearance gap is hardly formed between the round cooking container P bottom surface and the trivet claw 22 upper end surface.

Accordingly, even when the cooking container P whose bottom surface is round is put, it is possible to make the combustion gas into ideal spiral flow, and improve the heating efficiency.

Meanwhile, the same effect can be obtained when the shape of the trivet claw 22 upper end portion matches the shape of the cooking container P bottom surface and is not of downward concaved arc shape. For example, almost the same effect can be obtained with an inclined surface whose upper end surface is formed so as to become higher from the inner circumferential side to the outer direction.

Heretofore, the preferred embodiments according to the present invention have been explained, and it may be well understood by those skilled in the art that the present invention is not limited to the above preferred embodiments, but the present invention may be embodied by appropriately modifying the structural components thereof without departing from the spirit or essential characteristics thereof.

First, modified examples of the heat dissipation repressing means to be adopted in the trivet ring 21 are explained with reference to FIG. 12 through FIG. 14. Meanwhile, in the figures, the trivet claw 22 is of the conventional L shape, but only the structure of the trivet ring 21 is referred to, and in the application of the present invention, the trivet claw 22 is of the spiral shape as in the above preferred embodiments.

Figure 12:
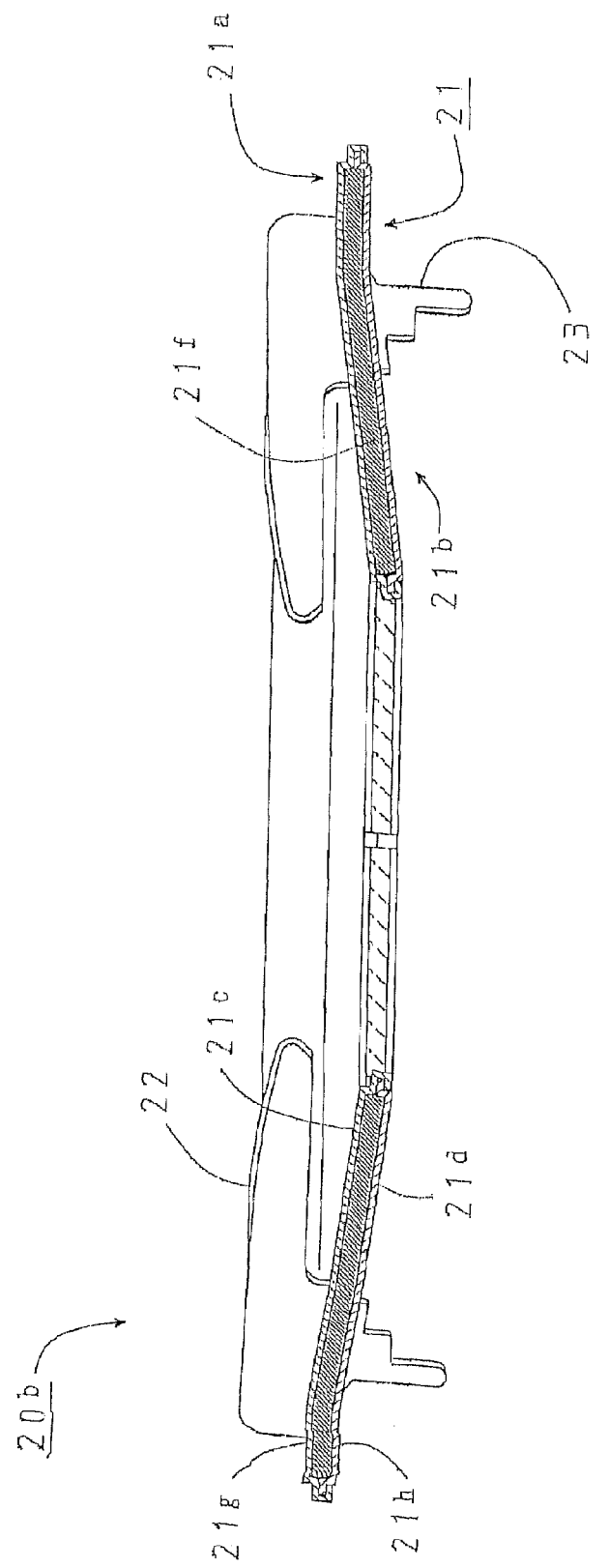
FIG. 12 is a cross sectional view showing a trivet adopting a modified example of heat dissipation repressing means.

The trivet ring 21 shown in FIG. 12 has a structure wherein a ceramic wool 21f as a heat insulation material is inserted without clearance into the space between the front plate 21a and the back plate 21b. By such a structure, the burner combustion gas heat transmitted to the front plate 21a is insulated by the ceramic wool 21f.

Accordingly, it is possible to securely prevent the burner combustion gas heat from being discharged to the outside, and improve the heating efficiency, and also repress the deterioration of the cooking environment. Further, the ceramic wool 21f is inserted between the front plate 21a and the back plate 21b without a clearance gap, and consequently, it is possible to improve the mechanical strength of the trivet ring 21. Furthermore, the ceramic wool 21f is used as a heat insulation material, and the ceramic wool 21f also functions as a cushioning material, and absorbs impact and vibration onto the trivet 20. Therefore, when the trivet 20 is dropped by mistake, and impact works onto the trivet 20, it is possible to keep the strength, and prevent noise due to vibration.

Figure 13:
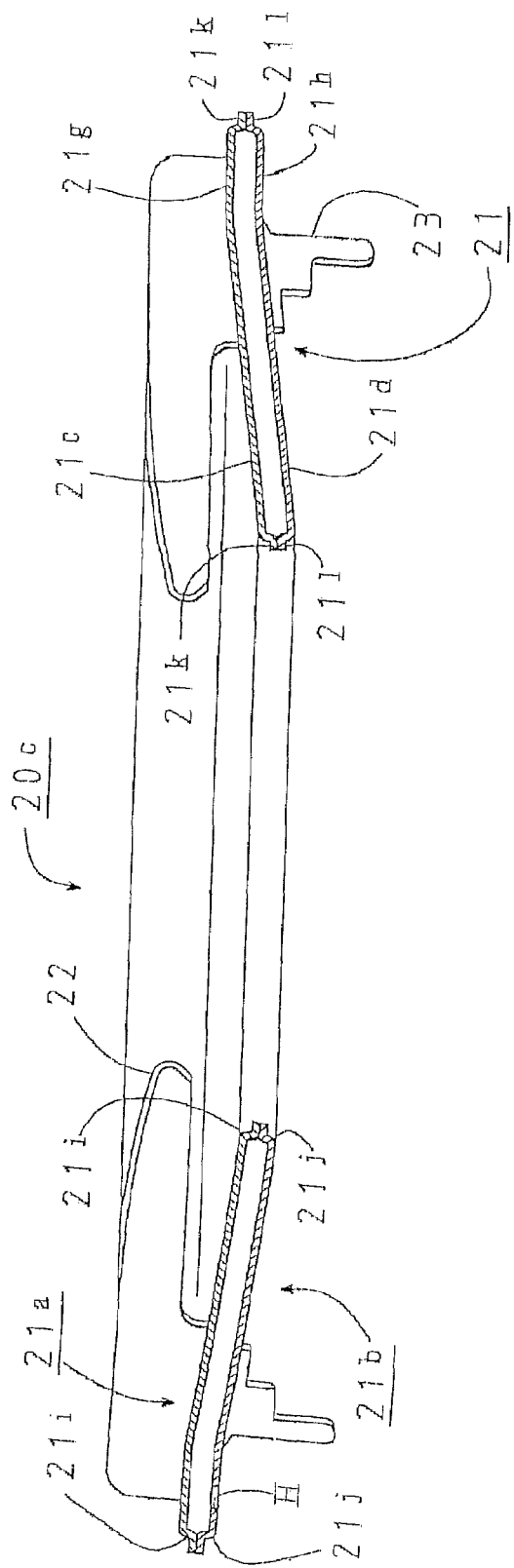
FIG. 13 is a cross sectional view showing a trivet adopting another modified example of heat dissipation repressing means.
Figure 14:
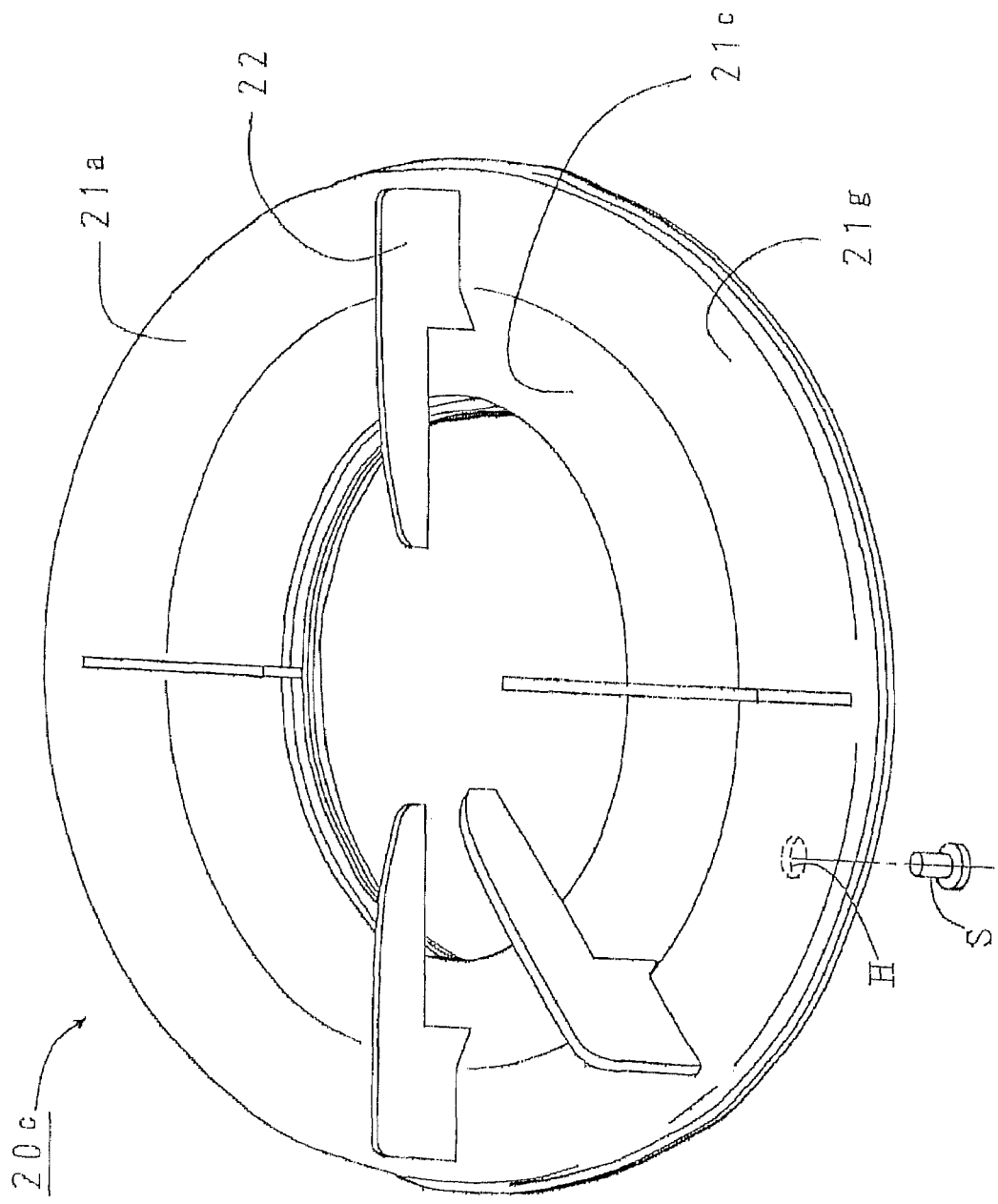
FIG. 14 is a cross sectional view showing a trivet adopting still another modified example of heat dissipation repressing means.
Figure 15:
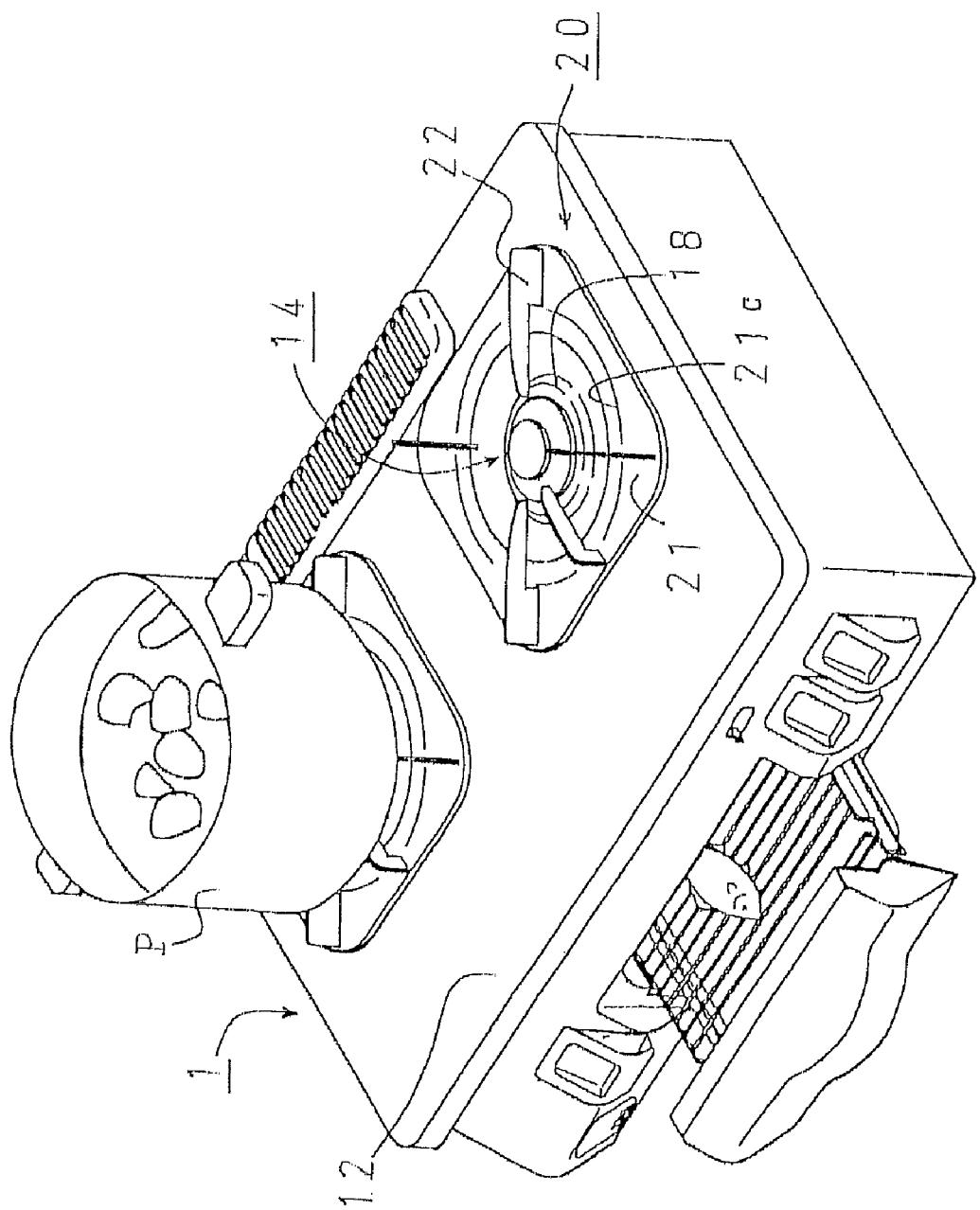
FIG. 15 is a perspective view showing a gas table according to the prior art.
Figure 16:
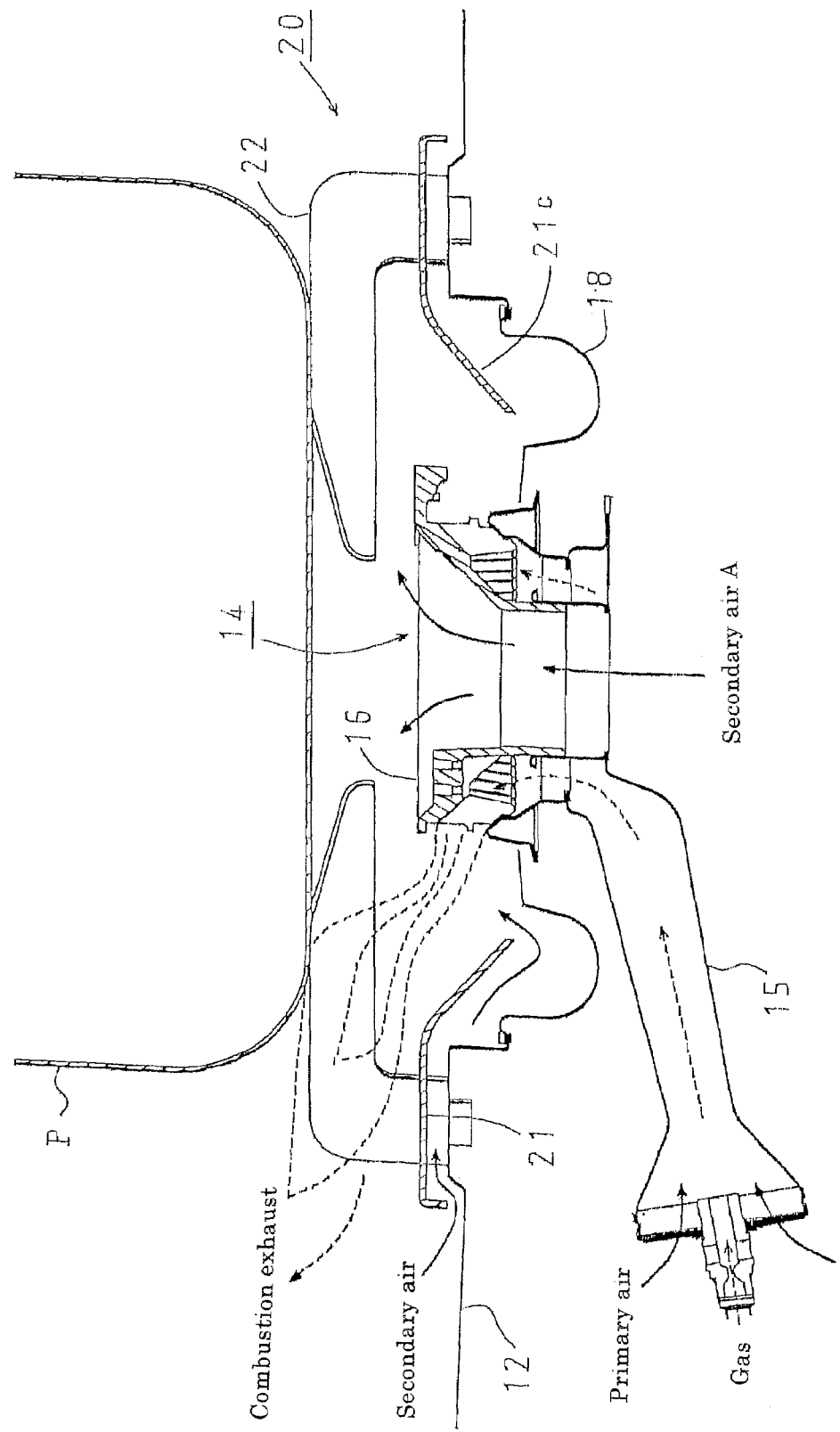
FIG. 16 is an explanatory figure showing the function of a gas table according to the prior art.
Figure 17:
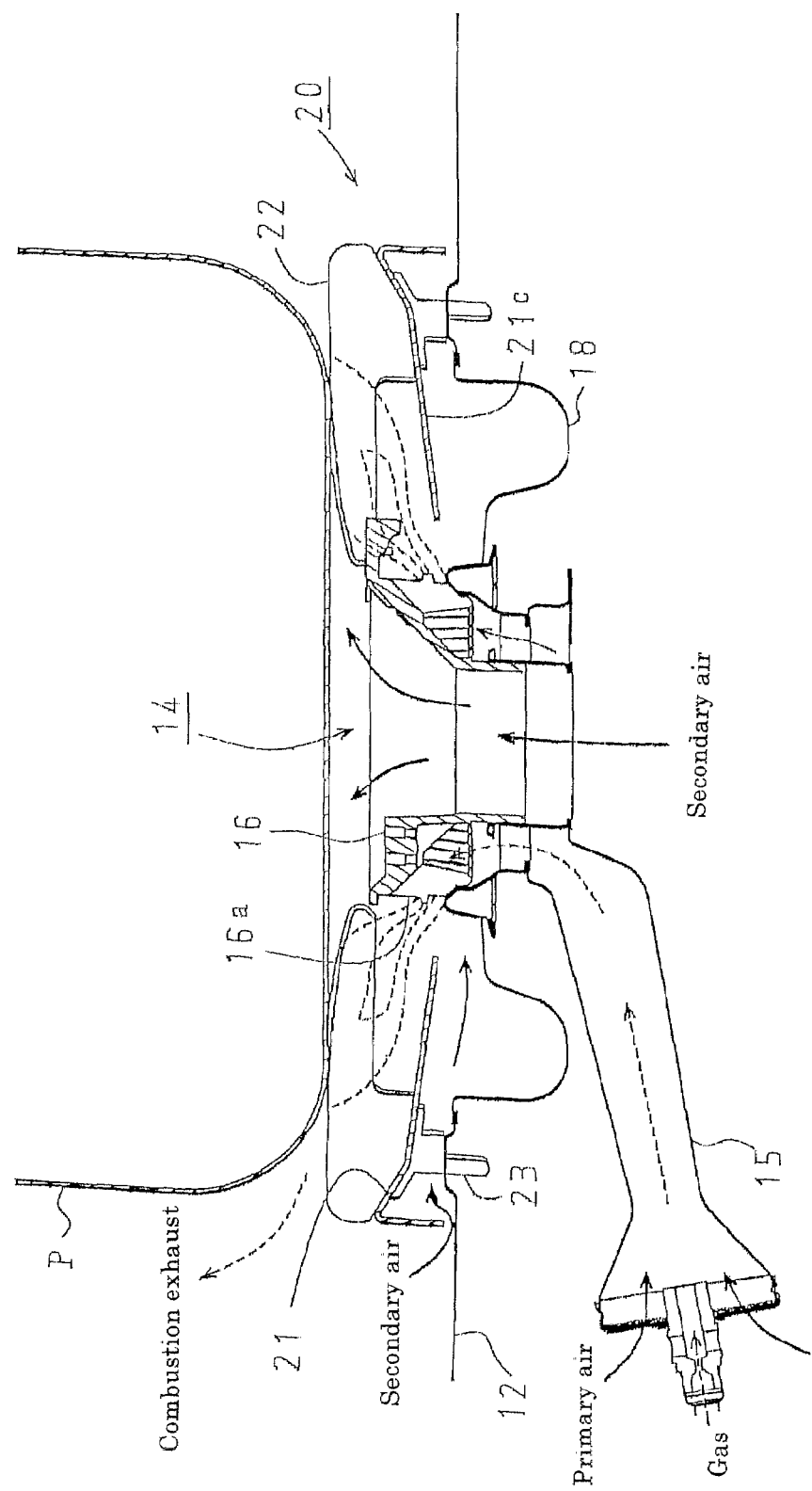
FIG. 17 is an explanatory figure showing the function of a gas table according to the prior art.

Next, the trivet ring 21 shown in FIG. 13 and FIG. 14 is one where the space between the front plate and the back plate is in vacuum state.

In the trivet ring 21, the front plate 21a, the back plate 21b have horizontal surface portions 21g, 21h respectively in the outer circumferential side, and on the inner circumferential side, jaw portions 21c, 21d are arranged.

In the entire inner circumferential end and the outer circumferential end, inwardly bent squeeze portions 21i, 21j and welding margins 21k, 21l protruding in the inner circumferential direction and the outer circumferential direction are formed on the front plate 21a and the back plate 21b respectively.

Further, in the under surface of the back plate 21b, a suction port H for making the space between the front plate 21a and the back plate 21b vacuum is formed.

The front plate 21a and the back plate 21b are welded at the welding margins 21k, 21l.

After absorption and exhaustion are carried out from the suction port H, the suction port H is blocked by a lid body S, and the lid body S is brazed and soldered to the back plate 21b. This blazing and soldering is adopted for jointing the front plate 21a and the back plate 21b while keeping the vacuum degree between the front plate 21a and the back plate 21b at a specified range.

Since the space between the front plate 21a and the back plate 21b is made vacuum, the vacuum portion works as a heat insulation layer.

In the vacuum state, there exists no molecule between the front plate 21a and the back plate 21b, and consequently, there occurs no heat movement between molecules.

Accordingly, it is possible to further securely prevent the burner combustion gas heat from being discharged to the outside, and improve the heating efficiency, and also repress the deterioration of the cooking environment.

Meanwhile, in the present preferred embodiment, the trivet claws 22 are formed of an arc plate, but trivet claws of a straight plate shape may be arranged so as to be inclined at a specified angle circumferentially to the straight line directed radially from the burner center.

Further, the trivet ring is not limited to one of the double structure, but one formed of a single plate may be applied, and a structure without the current plate 24 may be used too.

Furthermore, the burner 14 is not limited to the all primary burner that takes in almost of air necessary for combustion as primary air, but it may be applied to a gas table loading a Bunsen burner, a semi Bunsen burner, and a red flame type burner. Moreover, as the burner 14, a forced combustion type burner using the air supply fan 31 is shown in the illustration, but a natural combustion type burner not using the air supply fan may be used too.

Further, in the first and second preferred embodiments, the ring shaped combustion gas route is divided into plural gas routes by the plural arc shaped trivet claws 22, but a continuous spiral gas route may be formed by a series of spiral trivet from the center to the outer circumferential direction.

Meanwhile, in the first and second preferred embodiments, the cross sectional area of the ring shaped combustion gas route is made narrower as the distance from the center of the trivet ring 21, but it may be made same even when the distance changes (the route cross sectional area may not change).

Furthermore, as heat insulation materials, ceramic and ceramic wool are used, but the heat insulation materials are not limited to ceramic and ceramic wool, and any material having heat resistance property and heat insulation property may be used too.

Moreover, the fixation method of the front plate and the back plate is not limited to caulking fixation, and the number of fixation positions are not limited to four positions in the inner circumferential and outer circumferential end portions.

INDUSTRIAL APPLICABILITY

The present invention may be applied to various cooking stoves such as gas tables and built-in burner to be assembled in kitchen units and the like.

What is claimed is:

1. A cooking stove comprising:
   a burner that heats a cooking container from below; and
   a ring plate being a trivet ring arranged around the burner, said trivet ring having a front plate and an opposed back plate spaced from said front plate, wherein respective edges of said plates are joined to one another to form a space for reducing heat transfer from said front plate to said back plate;
   wherein the respective edges of said front plate and said back plate are sealed to one another to form a vacuum heat insulation space,
   a plurality of trivet claws arranged on an upper surface of the trivet ring, each of the trivet claws being formed in a spiral shape extending from an inner circumferential end thereof to an outer circumferential end thereof when viewed from above and being formed of an arcuate plate-like wall arranged on the upper surface of the trivet ring from the inner circumferential end to the outer circumferential end; and
   a current plate arranged on the trivet ring, the current plate circumscribing the trivet claws such that each of the trivet claws is arranged on an inner circumferential surface of the current plate, and such that each of the trivet claws extends higher above the trivet ring than the entirety of the current plate,
   wherein a ring shaped combustion gas route is formed between the upper surface of the ring plate and a bottom surface of the cooking container,
   wherein an exhaust guide is arranged in the combustion gas route that makes the combustion gas of the burner flow along the bottom surface of the cooking container in a spiral circulation shape toward the outer circumferential direction,
   wherein an upper surface of each trivet claw is for supporting the bottom surface of the cooking container as well as for functioning as the exhaust guide, and
   wherein when the cooking container is placed thereon, the upper surface of each trivet claw spirally contacts with the bottom surface of the cooking container, and the ring shaped combustion gas route is sectionally formed in a spiral gas route surrounded by the upper surface of the trivet ring, the trivet claws, the current plate, and the bottom surface of the cooking container.

2. A cooking stove according to claim 1, wherein the trivet claws are formed integrally with the trivet ring.

3. A cooking stove according to claim 2, wherein the upper surface of each trivet claw at the inner circumferential end of the trivet claw is formed lower than the upper surface of the trivet claw at the outer circumferential end of the trivet claw.

4. A cooking stove according to claim 1, wherein the upper surface of each trivet claw at the inner circumferential end of the trivet claw is formed lower than the upper surface of the trivet claw at the outer circumferential end of the trivet claw.

5. A cooking stove according to claim 1, wherein a cross sectional area of the ring shaped combustion gas route becomes smaller as the distance of the ring plate from the center becomes farther, or, the cross sectional area is same even when the distance becomes farther.

6. A cooking stove according to claim 1, wherein the burner is an external flame port burner where many flame ports are arranged in the outer circumferential direction, and a direction of a flame jetted from the flame ports is inclined by a specified angle in the burner circumferential direction to the straight line extending in a radial direction from the center of the burner.

7. A cooking stove according to claim 1, wherein each of the trivet claws is thicker in an axial direction, extending along a vertical axis of the cooking stove, from the upper surface of the ring plate near the inner circumferential end than at the outer circumferential end.

8. A cooking stove according to claim 1, wherein the burner is an all primary air-type burner.

\* \* \* \* \*